United States Patent
Hess et al.

(10) Patent No.: US 11,077,463 B2
(45) Date of Patent: Aug. 3, 2021

(54) METHOD FOR THE LAYERED MANUFACTURING OF A STRUCTURAL COMPONENT AND DEVICE

(75) Inventors: Thomas Hess, Munich (DE); Erwin Bayer, Dachau (DE)

(73) Assignee: MTU AERO ENGINES AG, Munich (DE)

( * ) Notice: Subject to any disclaimer, the term of this patent is extended or adjusted under 35 U.S.C. 154(b) by 1836 days.

(21) Appl. No.: 13/989,270

(22) PCT Filed: Nov. 10, 2011

(86) PCT No.: PCT/DE2011/001966
§ 371 (c)(1),
(2), (4) Date: Jun. 21, 2013

(87) PCT Pub. No.: WO2012/069037
PCT Pub. Date: May 31, 2012

(65) Prior Publication Data
US 2013/0280439 A1    Oct. 24, 2013

(30) Foreign Application Priority Data

Nov. 26, 2010  (DE) .......................... 102010052724.6
Apr. 7, 2011   (DE) .......................... 102011006941.0

(51) Int. Cl.
*B05D 3/06*     (2006.01)
*B29C 64/153*   (2017.01)
(Continued)

(52) U.S. Cl.
CPC ................ *B05D 3/06* (2013.01); *B22F 12/00* (2021.01); *B29C 64/153* (2017.08); *B22F 10/10* (2021.01); *B33Y 40/00* (2014.12); *Y02P 10/25* (2015.11)

(58) Field of Classification Search
CPC ..... B05D 3/06; B29C 67/0077; B22F 3/1055; B22F 2003/1056; Y02P 10/295
See application file for complete search history.

(56) References Cited

U.S. PATENT DOCUMENTS 5,427,733 A   6/1995 Benda et al.
5,530,221 A   6/1996 Benda et al.
(Continued)

FOREIGN PATENT DOCUMENTS

DE   4112695 A1    7/1992
DE   19514740 C1   4/1996
(Continued)

OTHER PUBLICATIONS

W.S. Park et al. "In-process Layer Surface Inspection of SLA Products", SPIE, Bd. 3517, 1998, pp. 70-78.
(Continued)

*Primary Examiner* — Robert J Grun
(74) *Attorney, Agent, or Firm* — Abel Schillinger, LLP

(57) ABSTRACT

The invention relates to a method for the layered manufacturing of a structural component from powder, comprising the following steps: establishing at least one parameter (t) of a depression (1) in a produced layer (2) of the structural component; smoothing out the depression (1) if the at least one parameter (t) exceeds a predetermined value; and filling the smoothed-out depression (1) with powder (13).

20 Claims, 2 Drawing Sheets

(51) Int. Cl.
  *B22F 12/00* (2021.01)
  *B33Y 40/00* (2020.01)
  *B22F 10/10* (2021.01)

(56) References Cited

U.S. PATENT DOCUMENTS

| | | |
|---|---|---|
| 5,730,925 A | 3/1998 | Mattes et al. |
| 6,492,651 B2 | 12/2002 | Kerekes |
| 7,047,098 B2 | 5/2006 | Lindemann et al. |
| 2002/0104973 A1 | 8/2002 | Kerekes |
| 2002/0152002 A1 | 10/2002 | Lindemann et al. |
| 2004/0173946 A1* | 9/2004 | Pfeifer ............... B29C 67/0077 264/497 |
| 2009/0152771 A1 | 6/2009 | Philippi et al. |
| 2013/0055568 A1* | 3/2013 | Dusel ................. B22F 3/1055 29/888.02 |

FOREIGN PATENT DOCUMENTS

| | | |
|---|---|---|
| DE | 10236907 A1 | 2/2004 |
| DE | 10310385 A1 | 9/2004 |
| DE | 102007056984 A1 | 5/2009 |
| EP | 1234625 A1 | 8/2002 |
| WO | 9511100 A1 | 4/1995 |
| WO | WO 2009/019645 * | 2/2009 ............. H01J 35/08 |
| WO | 2011110521 A1 | 9/2011 |

OTHER PUBLICATIONS

A. Lamikiz et al. "laser polishing of parts built up by selective laser sintering" International Journal of Machine Tools & Manufacture, No. 47, 2007, pp. 2040-2050.

Suman Das: "Physical Aspects of Process Control in Selective Laser Sintering of Metals", Advanced Engineering Materials, vol. 5, No. 3, 2003, pp. 701-711.

* cited by examiner

METHOD FOR THE LAYERED MANUFACTURING OF A STRUCTURAL COMPONENT AND DEVICE

BACKGROUND OF THE INVENTION

Field of the Invention

The present invention provides a method for the layered manufacturing of a structural component and a device for the layered manufacturing of a structural component.

Discussion of Background Information

Methods for the layered manufacturing of a structural component are also referred to as generative production methods or rapid prototyping methods. In the case of rapid prototyping methods, structural components are created from formless materials or materials of a neutral form. This takes place on the basis of chemical or physical processes, which are controlled by means of a computer-based data model. Rapid prototyping methods are distinguished by the fact that structural components can be produced within an extremely short time, in particular without previously having to make complex molds for manufacturing the structural components.

A method for the layered manufacturing of a structural component is known for example from EP 731743 B 1. In the case of the known method, layers of powder are sintered by means of a laser. During the irradiation of a respective layer of powder, the thermal radiation emission is detected. The power of the laser for irradiating a respective layer of powder is adapted in dependence on the detected thermal radiation emission. This is intended to eliminate defects in previous layers of powder.

In the case of structural components manufactured in a layered form there is the recurrent problem—even when the production method known from EP 731743 B1 is used—that the structural components have deep, narrow chambers. These chambers are produced because depressions in a previous, solidified layer of powder are not filled with powder, or only insufficiently, when a subsequent layer of powder is applied. This is often caused by the depressions being narrower than the maximum grain size of the powder or else having projections.

The object of the present invention is to provide a method and a device for the layered manufacturing of a structural component in which the occurrence of the aforementioned chambers is avoided, or at least reduced.

SUMMARY OF THE INVENTION

Accordingly, a method for the layered manufacturing of a structural component from powder is provided, comprising the following steps: detecting at least one parameter of a depression in a formed layer of the structural component; smoothing the depression if the at least one parameter exceeds a predetermined value; and filling the smoothed depression with powder.

Furthermore, a device for the layered manufacturing of a structural component from powder is provided, comprising: a first means, for detecting at least one parameter of a depression in a formed layer of the structural component; a second means, for smoothing the depression if the at least one parameter exceeds a predetermined value; and a third means, for filling the smoothed depression with powder.

The concept on which the present invention is based is that of detecting and smoothing depressions in a formed layer of the structural component. This smoothing is such that the depression can then be filled again with powder, that is to say the smoothed depression is wider than the maximum size of powder and, if appropriate, is freed of projections. The parameter is in this case chosen such that not every depression is smoothed, but only the depressions that are for example narrower than the maximum grain size of the powder or have a projection are smoothed. In this way, the chambers described at the beginning can be efficiently avoided.

The subclaims provide advantageous embodiments of the invention.

According to one embodiment of the method according to the invention, the at least one parameter describes a depth of the depression. A depth of the depression can be measured more easily than, for example, a width of the depression. This is so in particular if a laser beam or an electron beam is used for measuring the depth of the depression.

According to a further embodiment of the method according to the invention, the parameter is determined in dependence on a return radiation of a laser beam or an electron beam scanning the depression. On the basis of the return radiation, the depth of the depression can be easily concluded by means of triangulation.

According to a further embodiment of the method according to the invention, the parameter is determined in dependence on a peripheral radiation of the return radiation. This allows the angle required for the triangulation to be easily measured.

According to a further embodiment of the method according to the invention, the depression is smoothed by means of a laser beam or an electron beam. Accordingly, the laser beam or electron beam assumes two functions: on the one hand, it scans the depression for the detection of the at least one parameter; on the other hand, it serves for smoothing the depression.

According to a further embodiment of the method according to the invention, the smoothing is performed by repeated melting of the depression. In this way, the depression is gradually smoothed. This provides a controlled process, which requires a limited input of energy.

According to a further embodiment of the method according to the invention, an input of energy for melting the powder filling the depression is chosen to be greater than an input of energy in regions adjoining the depression. Since the thickness of the layer of powder is greater in the depression than in adjoining regions, a higher input of energy may also be necessary here.

According to a further embodiment of the method according to the invention, the parameter is detected at the same time as the forming of the layer. According to this embodiment, the laser beam or electron beam assumes three functions at once: firstly detecting the parameter, secondly smoothing the depression and thirdly forming the layer. This allows the method to proceed very quickly.

According to a further embodiment of the method according to the invention, the layer is formed by melting a first layer of powder, in particular by means of a laser beam or an electron beam, and/or the powder for filling the depression is part of a second layer of powder, covering the first layer of powder. In the present case, "melting" also includes "sintering". According to this embodiment, the depression is filled at the same time as the forming of the second layer of powder, which is efficient. The first and/or second layer of powder may be applied with a doctor blade.

In the case of the method according to the invention, the application of the first layer of powder, the detection of the at least one parameter, the smoothing of the depression and the filling of the same with powder by means of applying the second layer of powder to the first layer of powder are preferably repeated as long as it takes until the finished structural component is formed. The "first" layer of powder means the respectively preceding layer, the "second" layer of powder means the respectively following layer.

BRIEF DESCRIPTION OF THE DRAWINGS

The invention is explained in more detail below on the basis of exemplary embodiments with reference to the accompanying figures of the drawing.

Of the figures.

In the figures, the same reference numerals designate components that are the same or functionally the same, unless otherwise indicated.

DETAILED DESCRIPTION OF THE INVENTION

Figure 1:
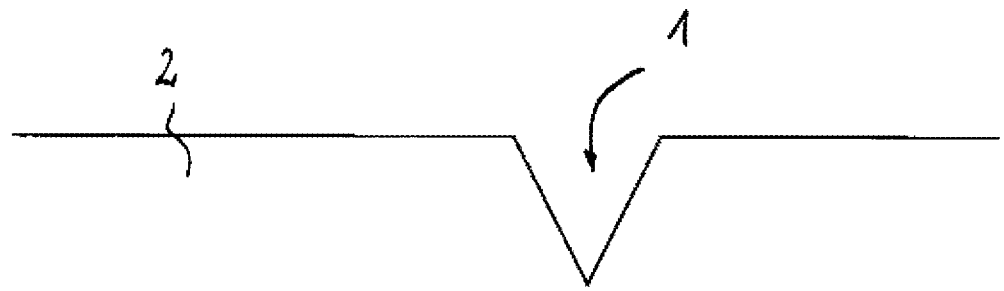
FIG. 1 schematically shows a depression.

FIG. 1 schematically shows a depression 1. The depression 1 is formed on a layer 2 of a portion of the structural component that is not otherwise represented any further. The layer 2 is formed by a first layer of powder, for example titanium powder, having been applied in a preceding method step to a table or a preceding layer and having been subsequently melted by means of a laser 3, represented in FIG. 2. The depression 1 may for example have been produced on account of an uneven application of the first layer of powder by means of the doctor blade 4, indicated in FIG. 2. Alternatively, the depression may be due to inadequate quality of the powder of the first layer of powder. This may be the case for example if the powder has powder grains of very varying size.

Figure 2:
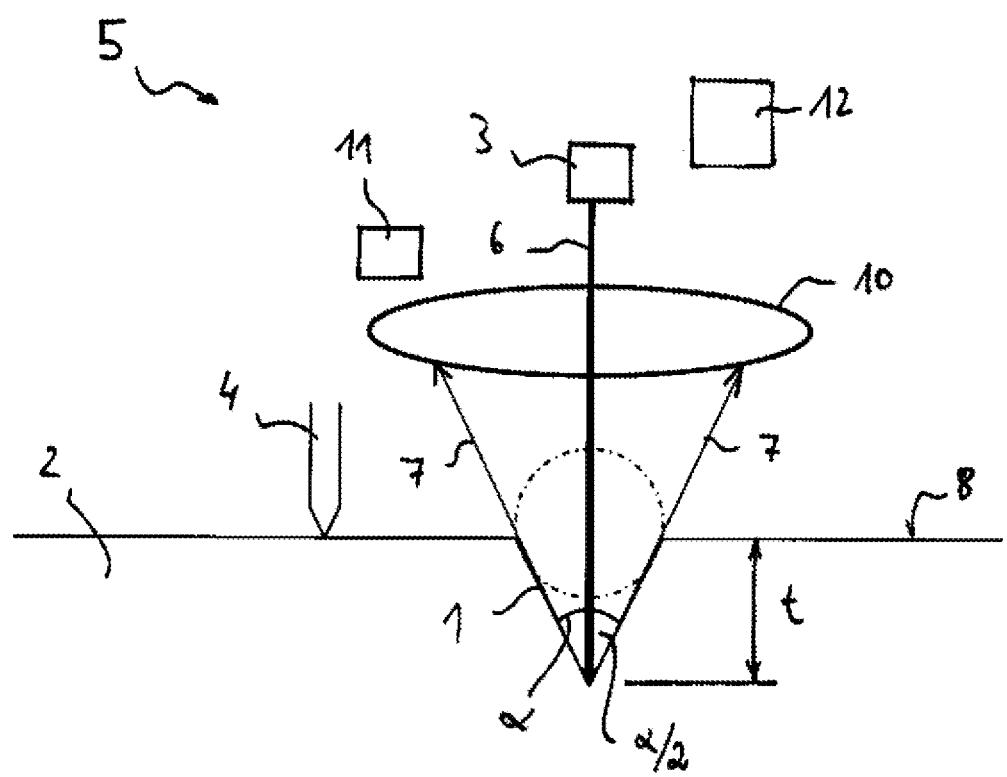
FIG. 2 schematically shows a device for the layered manufacturing of a component according to an exemplary embodiment of the present invention.

FIG. 2 schematically shows in a side view a device 5 for the layered manufacturing of a structural component and the layer 2 with the depression 1 from FIG. 1.

The device 5 comprises the already mentioned laser 3, which generates a laser beam 6. In the case of the method steps described in conjunction with FIG. 1, the laser beam 6 serves the purpose of melting the first layer of powder, in order thereby to produce the layer 2. After that, or preferably at the same time as the melting of the first layer of powder for producing the layer 2, the surface geometry of the formed layer 2 (which is then still in the form of a bath of melt) is also detected. In particular, the depth of penetration t of the laser beam 6 into the layer 2 or into the scanned portion of the structural component (the depression 1 may also extend over a number of layers 2) is thereby detected.

Figure 3:
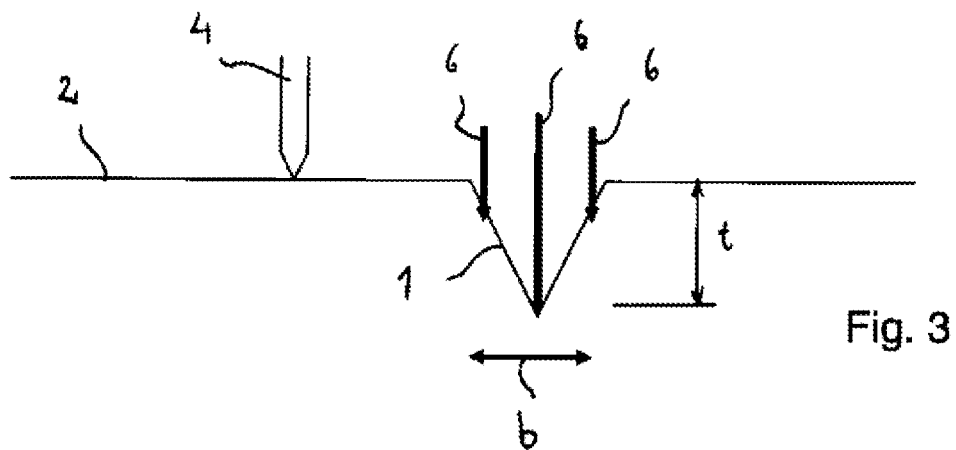
FIG. 3 shows a state of the method following on from FIG. 2 in the case of a method according to an exemplary embodiment of the present invention.
Figure 4:
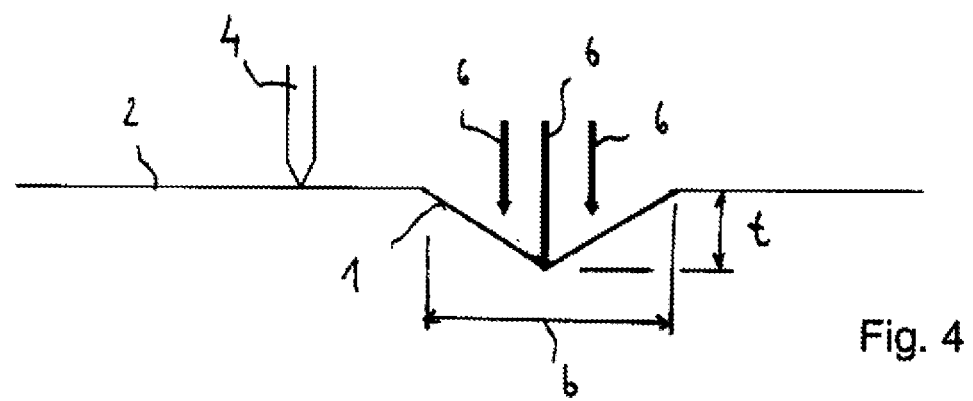
FIG. 4 shows a further state of the method, following on from the state of the method from FIG. 3.
Figure 5:
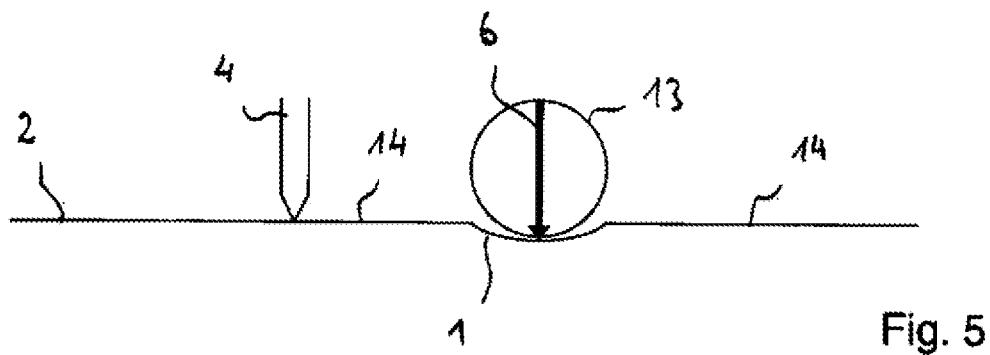
FIG. 5 shows yet another state of the method, following on from the state of the method from FIG. 4.

The depth of penetration t is preferably measured by the return radiation 7, that is to say the reflection of the laser beam 6 from the surface 8 of the layer 2 or the depression 1, being detected in one or more sensors 11. In this case, the peripheral radiation is preferably detected by the sensors 11. For this purpose, the sensors 11 are arranged behind a lens 10 of the laser 3. On the basis of the angle at which the peripheral rays 7 impinge on the sensors 11, the angle α can be concluded. The angle α is the angle between two peripheral rays 7 lying diagonally opposite one another in a plan view from FIG. 2. In the same way, the angle α/2, which is the angle between the laser beam 6 and one of the peripheral rays 7, can also be measured. On the basis of the angle α, the depth of penetration t can in turn be determined If a control means 12 of the device 5 then establishes that the depth of penetration t exceeds a predetermined threshold value, it controls the laser 3 for smoothing the depression 1, as represented in FIG. 3. The smoothing is achieved by the laser beam 6 passing repeatedly over the depression 1, as indicated in FIG. 3 by the three laser beams 6, in order thereby to melt the material of the depression 1. The material is melted for as long as it takes until the depth of penetration t of the laser beam 6 is reduced. This takes place in particular by an increase in the width b of the depression 1 on account of replenishing material. The depth of penetration t and, if appropriate, the width b of the depression 1 are continuously monitored by the control means 12. The smoothing of the depression 1 is repeated for as long as it takes until the depth of penetration t falls below a predetermined threshold value. In addition or alternatively, the smoothing may be performed in dependence on the width b. The smoothing or repeated melting is preferably repeated for as long as it takes until the largest powder grain 13 potentially contained in the powder fits into the depression 1, as represented in FIG. 5.

In a further method step, further powder is then applied by means of the doctor blade 4 to the existing layer 2, in order to produce a further layer of powder on this existing layer. One or more grains of powder 13 thereby fill the smoothed depression 1.

In a further method step, the further layer of powder comprising the grains of powder 13 is then melted by means of the laser beam 6. In the region of the depression 1, the laser power of the laser 3 can in this case be increased in comparison with the surrounding regions 14 of the further layer of powder (not represented), which may be necessary to melt all of the powder 13 in the depression 1.

Although the invention has been described in the present case on the basis of preferred exemplary embodiments, it is not in any way restricted to these but can be modified in various ways. In particular, it should be pointed out that, in the present case, "a" does not exclude a plurality. It should also be mentioned that the refinements and exemplary embodiments described in the present case for the method according to the invention can be applied correspondingly to the device according to the invention, and vice versa.

What is claimed is:

1. A method of manufacturing a structural component from a powder, wherein the method comprises forming the structural component layer by layer by a process which comprises melting a first layer of powder to form a first layer of the structural component and forming a second layer of the structural component on the formed first layer by melting a second layer of powder applied on the formed first layer and wherein the method further comprises:
   detecting at least one parameter of an unfilled depression in a formed layer of the structural component;
   smoothing the unfilled depression if the at least one parameter exceeds a predetermined value; and
   filling the smoothed unfilled depression with powder.

2. The method of claim 1, wherein the at least one parameter represents a depth of the unfilled depression.

3. The method of claim 2, wherein the at least one parameter is determined in dependence on a return radiation of a laser beam or an electron beam that scans the unfilled depression.

4. The method of claim 3, wherein the at least one parameter is determined in dependence on a peripheral radiation of the return radiation.

5. The method of claim 1, wherein the at least one parameter is determined in dependence on a return radiation of a laser beam or an electron beam that scans the unfilled depression.

6. The method of claim 5, wherein the at least one parameter is determined in dependence on a peripheral radiation of the return radiation.

7. The method of claim 1, wherein the unfilled depression is smoothed by a laser beam.

8. The method of claim 7, wherein an input of energy for melting the powder filling the unfilled depression is greater than an input of energy in regions adjoining the unfilled depression.

9. The method of claim 1, wherein the unfilled depression is smoothed by an electron beam.

10. The method of claim 9, wherein an input of energy for melting the powder filling the unfilled depression is greater than an input of energy in regions adjoining the unfilled depression.

11. The method of claim 1, wherein smoothing is performed by repeatedly melting the unfilled depression.

12. The method of claim 1, wherein an input of energy for melting the powder filling the unfilled depression is greater than an input of energy in regions adjoining the unfilled depression.

13. The method of claim 12, wherein the method further comprises providing the powder for filling the unfilled depression as part of a powder for a second layer of powder that covers the formed first layer.

14. The method of claim 13, wherein the first layer of powder is melted by at least one of a laser beam and an electron beam.

15. The method of claim 1, wherein the at least one parameter is detected concurrently with forming the layer.

16. The method of claim 15, wherein the at least one parameter is determined in dependence on a return radiation of a laser beam or an electron beam that scans the unfilled depression.

17. The method of claim 1, wherein the method further comprises providing the powder for filling the unfilled depression as part of a powder for a second layer of powder that covers the formed first layer.

18. The method of claim 17, wherein the first layer of powder is melted by at least one of a laser beam and an electron beam.

19. The method of claim 17, wherein the first layer of powder is melted by a laser beam.

20. The method of claim 17, wherein the first layer of powder is melted by an electron beam.

* * * * *